Patented Aug. 8, 1950

2,518,359

UNITED STATES PATENT OFFICE 2,518,359

COATING FOR INSULATION BOARDS

Henry Z. Mohrer, Chicago, Ill., assignor to United States Gypsum Company, Chicago, Ill., a corporation of Illinois No Drawing. Application July 21, 1947, Serial No. 762,543

5 Claims. (Cl. 106—213)

The present invention relates to improvements in coatings as applied to relatively porous insulating boards, with especial emphasis upon the application of the coatings to the insulation board at that stage of its manufacture where it is still wet, so that the drying of the board and of the coating can take place simultaneously.

Attempts have been made to do this, but it was soon discovered that unless special precautions were taken by the incorporation of the steps of the present invention, as hereinbelow more fully stated, the coatings would be uneven and of an unsightly, blotched appearance. This was noticeable even with white coatings, containing a starch vehicle and a water-dispersed clay, and was particularly marked with tinted and colored coatings, such as are usually applied to insulation board that is intended as the interior surface of houses. In such cases it was also found that it was virtually impossible to maintain a uniform shade or color over an extended period of time, even though the same batch of coating composition was used during the entire run.

It was further discovered that this irregularity in appearance was occasioned by what may properly be termed the "migration" of the various components of the coating composition, which phenomenon is markedly accentuated when the coating is applied to the wet insulation board. This migration is believed to be caused by:

(1) Seepage of water-soluble materials in the wet insulating board mat to the surface during the drying operation;

(2) Migration of a starch film to the surface of the coating;

(3) The rising of pigment particles to the surface together with the migration of the starch.

In the case of light colored coatings, such as white or ivory tints, causes 1 and 2 are believed to account for the major share of the migration, while in the case of the darker colors, the third cause appears to be the most important contributing factor. The degree to which migration affects the final color of the coating may be determined by preparing two coatings containing the same quantities of colored pigments; one of the coatings being made with, and the other without, the conventional amount of starch binder vehicle. It will be found that upon the application of these coatings to any material, such as glass, wood, or insulation board, the dry coating containing the starch vehicle will be considerably darker in color than the one containing no binder. It will further be found that the difference in color between the coatings will largely depend on the thickness of the coating applied; in other words, the thicker the coating, the greater will be the difference in color. Another factor is the percentage of water in the coating, as this also influences the amount of migration.

Migration in starch coatings thus depends primarily upon two factors:

(1) The amount of water present in the coating, which, in turn, determines the rate of drying after its application to the surface of the board. Obviously, the longer the drying time, the more starch (and pigment particles carried thereby) can rise to the surface.

(2) The thickness of the coating film likewise produces a disturbing effect. When a thin film of coating is applied to the board, only relatively small quantities of starch and pigment can rise to the surface of the coating; while, conversely, when a heavier coat is applied, larger amounts of starch and pigment can migrate during the drying operation.

It might be believed that most of these difficulties could be resolved by the proper control of uniformity in the coating compositions and accuracy in their application, but this is defeated by the fact that the inherent and characteristic texture of the insulating board is such as to preclude the application of an even coating over every portion of its surface. When it is considered that insulation board is made by continuously filtering out a dilute suspension of more or less heavily sized fibers on a filter wheel, such as that of an Oliver type of board-forming machine, and that the resultant wet board is then compressed between absorbent felts which are pressed against the board by rollers, it will at once be evident that it could not possibly have a sufficiently smooth surface to permit the application of an entirely even coating. The board will also be unequally absorbent on its surface, and will contain low spots as well. Its relatively rough texture also precludes the use of a doctor blade, and the coating must be applied by means which do not tear up the surface of the board. Usually, such coatings are applied by a pool and roller method, a pool of the coating composition being maintained just ahead of a spreading roller which controls, within the limits as just defined, the thickness of the coating. While the distance of the roller from the highest portions of the board can be accurately adjusted, yet the low spots will unavoidably be provided with a thicker coating.

The present invention has for its primary object the production of coatings on still wet insulation boards, which coatings will dry uniformly to an even and pleasing appearing surface, which can be used for decorative purposes, without requiring re-coating or painting by the user.

A further object is to provide a coating so constituted that migration of the vehicle and the pigments and fillers therein will be sufficiently repressed, or totally avoided, particularly when the coating is rapidly dried at temperatures above atmospheric, to the effect that uniform coatings can be secured.

Further objects of the invention will appear from the more detailed description to follow.

The novel feature of the present invention is the incorporation with a vehicle consisting of starch, and in which pigments, fillers and colors are suspended, of a suitable amount of a material from the group consisting of the butyl alcohols and tributyl phosphates, which materials will prevent the migration of the starch vehicle and of the pigments, this being particularly true when the drying is effected rapidly, as at temperatures above atmospheric. The additive materials may be incorporated with the coating composition at almost any stage of its manufacture, but preferably after it has been compounded.

A suitable composition may consist of the following ingredients, in about the proportions given (which are the amounts present in the finished composition in the form in which it is ready for application to the still wet insulating board):

| | Parts by weight |
|---|---|
| Starch (gelatinized) | 25 |
| Clay | 128 |
| Ground mica | 40 |
| Tetrasodium pyrophosphate | 0.6 |
| Pigments | 20 |
| A tributyl phosphate | 5–20 |
| Water | 150–250 |

One of the butyl alcohols may be substituted for the tributyl phosphate, such as normal, secondary, tertiary or iso-butyl alcohol. The butyl radical in the phosphate may be any one of the four known butyl groups.

If butyl alcohol is used, it will require from 40 to 80 parts thereof instead of the 5 to 20 of the tributyl phosphate.

The following is an operative example of one method of successfully compounding the above coating composition:

100 pounds of a thin-boiling starch (for instance a mixture of pearl starch and oxidized starch) are suspended in 640 pounds of water to form a starch milk, which is then cooked at about 200° F. for about 15 minutes to produce a thoroughly gelatinized starch solution. In another tank containing 720 pounds of water, 700 pounds of white coating clay and 250 pounds of finely ground mica, of the type used in making paper-coating compositions, are added, being dispersed in the water by the aid of 3.5 pounds of tetrasodium pyrophosphate as a deflocculating agent, so that a smooth suspension of the clay and the mica will result. The previously made starch solution is now combined with the clay and mica suspension and the mixture stirred until uniform. If a colored coating is to be made, the colors are first blended with the clay and mica suspension prior to the addition of the starch solution.

There is then added the calculated amount of either the tributyl phosphate or the butyl alcohol, based upon the proportions above given, and the mixture is stirred until uniform. As both the tributyl phosphate and the butyl alcohol are liquids, this is readily accomplished. Finally, enough water is added to bring the volume of the composition to 116 gallons.

The coating thus prepared is then applied to the wet insulation board, preferably at a time when it is still on the forming-machine and before the continuous ribbon of wet insulation board is cut into individual board lengths. The coating method may be any that is now in use, although the "pool and roller" method is the preferred manner of applying the composition. A very effective way to apply the coating composition is to pour it onto the moving wet board, through a pipe provided with numerous perforations, directly ahead of a suitable distributing roller, so that a more or less constant pool of coating composition will be built up ahead of the roller. The coating composition may be supplied from a suitably elevated supply tank, running to the perforated pipe by gravity, or it may be pumped from a lower elevation. Such means and methods of coating are very well known in the art, and hence require no illustration or further explanation as they will be fully understood by those skilled in the art. The board then proceeds into a dryer, in which it, as well as the coating, is dried.

The choice of fillers and pigments is, obviously, quite large, depending upon the color of the coating. The clay and mica are both fillers, although in the case of white or light-colored coating compositions, they may also play the dual role of pigments. Other white pigments such as titanium dioxide (preferably on barium sulfate), satin-white, zinc oxide, etc., may also be used. Colored pigments may include chromium oxide, cadmium sulfide, ultramarine and various color-lakes, lamp-black, and the like. Hence in the subjoined claims, the term "pigment-fillers" is used as a collective designation of pigments and fillers.

Obvious equivalents, and mixing techniques known to the art, are to be construed as within the scope of the present invention for which applicant claims:

1. A liquid coating composition suitable for application to wet insulating board during its process of manufacture consisting essentially of an aqueous gelatinized starch vehicle, pigment-fillers, and an amount of tributyl phosphate equal to from about 20% to about 80% by weight, as calculated on the starch in the composition.

2. A liquid coating composition suitable for application to wet insulating board during its process of manufacture, consisting essentially of pigment-fillers, water, and a binder which latter consists essentially of gelatinized starch and from about 1 to about 4 parts by weight of a tributyl phosphate for each 5 parts by weight of said starch.

3. A liquid aqueous coating composition suitable for application to wet insulating board during its process of manufacture containing water, pigments and a starchy binder which latter consists essentially of gelatinized starch and a tributyl phosphate, the relationship of the starch and tributyl phosphate (on a dry weight basis) being about as 5 of starch to from about 1 to 4 of said tributyl phosphate.

4. A liquid coating composition suitable for application to wet insulating board during its process of manufacture containing water, pigments and a starchy binder which latter consists essentially of about 25 parts by weight of starch and about 5 to about 20 parts by weight of a tributyl phosphate, the starch being in the gelatinized condition.

5. A liquid coating composition suitable for application to wet insulating board during its process of manufacture consisting essentially of about the following ingredients, in parts by weight:

| Ingredient | Parts |
|---|---|
| Starch (gelatinized) | 25 |
| Pigment-fillers | 188 |
| A tributyl phosphate | 5 to 20 |
| Water | 150 to 250 |

HENRY Z. MOHRER.

REFERENCES CITED

The following references are of record in the file of this patent:

UNITED STATES PATENTS

| Number | Name | Date |
|---|---|---|
| 1,733,524 | Bradner | Oct. 29, 1929 |
| 1,827,083 | Harvey | Oct. 13, 1931 |
| 2,185,859 | Massey | Jan. 2, 1940 |
| 2,229,620 | Bradner | Jan. 21, 1941 |
| 2,287,161 | Ball | June 23, 1942 |
| 2,374,676 | Gardner | May 1, 1945 |
| 2,378,113 | Van De Carr | June 12, 1945 |
| 2,388,526 | Craig | Nov. 6, 1945 |

OTHER REFERENCES

Kerr: "Chemistry and Industry of Starch," pages 356, 357, and 452, published by Academic Press, Inc., New York, N. Y. (1944).